Patented Apr. 20, 1948

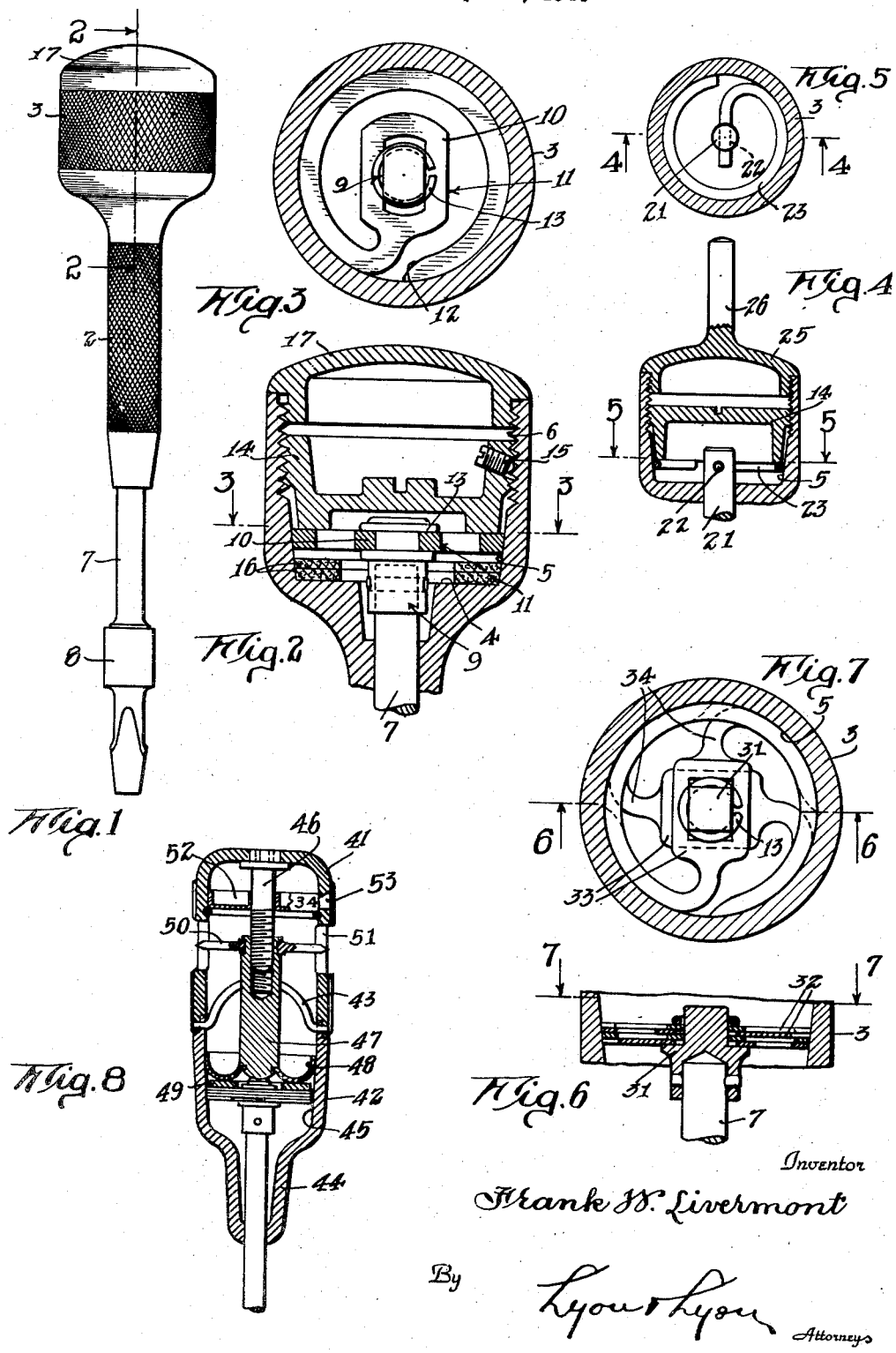

2,439,980

UNITED STATES PATENT OFFICE 2,439,980

LIMITED TORQUE TOOL

Frank W. Livermont, Los Angeles, Calif., assignor to Richmont, Inc., Los Angeles, Calif., a corporation of California Application September 4, 1944, Serial No. 552,611

7 Claims. (Cl. 64—30)

My invention relates to limited torque tools, that is, to tools such as wrenches, screwdrivers, or tapping devices which are designed to prevent the application of torque in excess of a predetermined value to screws, bolts, nuts or the like, thereby to prevent damage thereto or to the members being joined by such screwthread devices. Among the objects of my invention are:

First, to provide a tool of this character which incorporates a novel clutch or drive construction adapted to be adjusted to slip when a predetermined torque between the handle and the operating end of the tool is exceeded, the clutch construction being inherently capable of maintaining its adjustment and maintaining a correspondingly uniform torque relationship even after repeated use.

Second, to provide a tool of this character which involves a minimum number of parts all of which are easily constructed.

With the above and other objects in view as may appear hereinafter, reference is directed to the accompanying drawings, in which:

Fig. 1 is a elevational view illustrating one form of the tool.

Fig. 2 is an enlarged fragmentary, longitudinal sectional view through 2—2 of Fig. 1, showing one form of the clutch or drive construction.

Fig. 3 is a transverse sectional view thereof also enlarged, taken through 3—3 of Fig. 2.

Fig. 4 is a fragmentary sectional view similar to Fig. 2, showing a modified form of the clutch or drive construction.

Fig. 5 is a transverse sectional view thereof through 5—5 of Fig. 4.

Fig. 6 is an enlarged fragmentary sectional view similar to Figs. 2 and 4, showing a further modified form of the clutch or drive construction.

Fig. 7 is a sectional view thereof taken through 7—7 of Fig. 6.

Fig. 8 is a longitudinal sectional view of a further modified form of the limited torque tool which incorporates means for indicating the torque setting of the tool.

With reference first to Figs. 1, 2 and 3, my limited torque tool comprises a handle structure which includes a sleeve 2 at the upper end of which is an enlargement forming a hollow head 3. Within and at the base of the head 3 a shoulder 4 is formed. The inner side walls of the head adjacent the shoulder 4 form a tapered portion 5. Axially outwardly from the tapered portion the head 3 is internally threaded as indicated by 6.

The sleeve 2 journals a stem 7, the outer end of which is adapted to receive any one of several forms of drive tools such as screwdrivers, socket wrenches, tapping devices and the like.

The upper end of the stem 7 projects within the head 3 and is provided with a ferrule 9 secured thereto by a suitable pin. The ferrule is provided with opposed flattened sides and a shoulder to support the hub 10 of a spiral drive spring 11. The hub 10 is in the form of a rectangular loop the ends of which are spaced from the ferrule 9 so that the spiral spring has limited bodily lateral movement relative to the ferrule and the stem. The drive spring is preferably a planular spiral having somewhat in excess of one convolution, and may be stamped from sheet stock. At least a major portion of the outer periphery of the drive spring has approximately a constant radius so that it may be disposed concentrically with respect to the stem 7. The outer edge of this portion of the drive spring is beveled as indicated by 12, and is adapted to bear against the tapered portion 5 of the head 3 to form a frictional drive connection between the handle structure and the stem 7. The pressure exerted by the spring against the handle structure, determines the torque which may be exerted by the drive tool before the handle structure rotates relative to the stem. It should be noted that the drive spring provides its frictional connection when the handle structure rotates in a direction to constrict the spring, namely, in the direction in which the outer extremity of the drive spring points, or clockwise as shown in Fig. 5.

A split retaining ring 13 is adapted to snap into a groove provided in the upper end of the ferrule 9 in order to hold the drive spring 11 thereon.

The internal threads 6 are adapted to receive a lock nut 14 which is adapted to engage the peripheral portion of the drive spring 11 and position the drive spring axially relative to the tapered portion 5. Thus as the lock nut 14 is adjusted downwardly as viewed in Fig. 2, the drive spring is constricted radially by the tapered portion 5, and consequently, the frictional contact between the drive spring and the tapered portion is increased. A set screw 15 is provided for securing the lock nut in any adjusted position.

If desired, a pad or pads 16 of yieldable material such as felt, may be placed between the drive spring 11 and the shoulder 4.

The head 3 is covered by a cap member 17. The cap member may be designed so that it may be secured tightly in place after the desired torque relationship between the stem and the head 3 has been obtained, so that the operator cannot readily change this adjustment and apply greater or less torque to the tool element than is safe or desirable.

Reference is now directed to the structure shown in Figs. 4 and 5. This structure operates essentially the same as that shown in Figs. 1, 2 and 3, the essential difference being that the clutch or drive connection between the stem and the handle is simplified. In this construction the handle structure and its elements are essentially the same as that in the first described structure. A stem 21 is provided, the outer end of which is adapted to receive a drive tool such as the drive tool 8 (not shown). The inner end of the stem 21 is provided with a diametrically extending hole which receives a journal portion 22 forming the central end of a spiral drive spring 23. In this case the drive spring is formed of wire of circular cross-section and the journal portion is merely a straightened length of the wire. As in the first construction, the outer periphery of the drive spring 23 bears against the tapered portion 5 of the handle structure and is adjusted axially relative thereto by means of the lock nut 14. The cap 17 may close the upper end of the structure shown in Fig. 4. However, for purposes of illustration, a modified cap 25 having an upwardly extending stem 26 is shown. The caps 17 and 25 are interchangeable, that is, either one may be used on any of the structures herein described. The cap 25 is employed when it is desired to secure the tool in a chuck such as a drill chuck.

Reference is now directed to Figs. 6 and 7. Here also the handle structure may be identical to that shown in Figs. 1, 2 and 3. The upper or inner end of the stem 7 is provided with a ferrule 31 having a shoulder and a square extremity extending upwardly therefrom. The ferrule supports a plurality of drive springs 32 which may be identical in plan to the drive spring 11, but instead are formed from thinner sheet stock. Each drive spring 32 is provided with a hub 33 having a rectangular opening therein so that the drive spring is capable of limited bodily lateral movement relative to the hub 33. The drive springs are oriented in different directions, that is, in the construction illustrated they are oriented 90° apart. By this means side thrust on the stem 7 is minimized.

Reference is now directed to Fig. 8. In this structure a pair of complementary housing members 41 and 42 are provided which have telescoping ends secured by a spring yoke 43. The spring yoke 43 comprises a curved spring portion terminating in diametrically opposed outwardly extending extremities which fit in mating holes in the housing members. These extremities are pushed inward by a suitable tool when it is desired to separate the housings.

The lower housing is provided with a sleeve 44 and a tapered portion 45 corresponding to the tapered portion 12 of the previously described structures. The sleeve and tapered portion receive a stem and drive spring which may take the form of any of the previously described stems or drive springs. The upper housing member 41 journals an adjusting screw 46, the upper end of which is exposed and provided with a polygonal socket to receive a suitable wrench. The adjusting screw extends downwardly into a threaded socket formed in a thrust bar 47. The lower end of the thrust bar 47 is provided with an end flange 48 which may be an annular cup-shaped member arranged to bear against a washer 49 resting on the drive spring or springs, as the case may be.

A cross bar 50 is secured to the upper end of the thrust bar 47. The extremities of the cross bar 50 extend into slots 51 provided in the upper housing 41 to prevent rotation of the thrust bar. The adjusting screw 46 is provided with a wheel 52 mounted above the thrust bar. The wheel is provided with an upturned rim which registers with an opening 53 provided in the upper housing 41. The rim of the wheel 52 may bear numerals and the outer sides of the upper housing 41 may have numerals (not shown) along the side of the slots 51. These numerals may be arranged to indicate units and tens, respectively, and may represent a calibration of the frictional relation between the drive spring and housing; for example, in terms of inch-pounds of torque. Thus, with the arrangement shown in Fig. 8, the amount of torque for which the tool is adjusted, may be observed or the tool may be adjusted to a predetermined torque setting as evidenced by the position of the cross bar 50 and the numerals on the wheel 52.

Many other embodiments of the invention may be resorted to without departing from the spirit of the invention.

I claim:

1. A limited torque tool comprising: a handle including a head having a tapered bore, and a sleeve extending from said head; a tool stem rotatably mounted in said sleeve, and protruding into said head; a planular spiral element attached at its radially inner end to said stem and having a radially outer peripheral portion adapted to engage frictionally said tapered portion to form a drive connection between said stem and said handle; and means for adjustably positioning said spiral element relative to said tapered portion to vary the frictional contact therewith.

2. A limited torque tool comprising: a handle including a head having a tapered bore, and a sleeve extending from said head; a tool stem rotatably mounted in said sleeve, and protruding into said head; a planular spiral element having a radially inner end and a radially outer peripheral portion; means connecting said radially inner end with said stem to permit limited lateral displacement of said spiral element; said radially outer peripheral portion adapted to engage frictionally said tapered bore to form a drive connection between said handle and stem; and means for adjustably positioning said spiral element relative to said tapered portion to vary the frictional contact therewith.

3. A construction as set forth in claim 2, wherein several of said spiral elements are arranged in a laminated stack and oriented in different directions on said stem.

4. A construction as set forth in claim 1, wherein several of said spiral elements are arranged in a laminated stack and oriented in different directions on said stem.

5. A limited torque tool comprising: a handle including a hollow head having tapered walls; a stem rotatably mounted in said head; a planular spiral spring having a radially inner extremity connected with said stem and an radially outer peripheral portion adapted to bear frictionally against said tapered walls; means for positioning said spring at various levels relative to said tapered walls thereby to variably constrict said spring to vary correspondingly the torque resisting frictional engagement between said spring and tapered walls; and an indicating instrumentality moved by said means to indicate the torque value required to overcome the frictional engagement between said spring and tapered walls.

6. A limited torque tool comprising: a handle including a hollow head and a sleeve extending therefrom; a tool stem rotatable in said sleeve; a spiral spring having a radially inner end secured to said stem and a radially outer peripheral extremity adapted to bear against the interior of said head to establish a frictional drive connection between said handle and said stem; the portion of said head engaged by said spring being tapered; and means for positioning said spring at various levels relative to said tapered portion thereby to vary the frictional engagement between said spring and said tapered portion.

7. A limited torque tool comprising: a handle including a hollow head and a sleeve extending therefrom; a stem rotatable in said sleeve; a planular spiral element having a radially inner end, and a radially outer peripheral portion; means connecting the radially inner end of said spiral element with said stem to permit limited lateral displacement of said spiral element; said means including a rectangular loop at the inner end of said spiral element and a guide on said stem fitting within said loop; the radially outer peripheral portion of said spiral element adapted to frictionally engage the interior of said head to form a drive connection between said handle and stem.

FRANK W. LIVERMONT.

REFERENCES CITED

The following references are of record in the file of this patent:

UNITED STATES PATENTS

| Number | Name | Date |
|---|---|---|
| 458,408 | Schwanhausser | Aug. 25, 1891 |
| 1,346,245 | Palosky | July 14, 1920 |
| 1,468,322 | Odom | Sept. 18, 1923 |
| 1,507,331 | Benko | Aug. 26, 1924 |
| 1,876,658 | Fox | Sept. 13, 1932 |

FOREIGN PATENTS

| Number | Country | Date |
|---|---|---|
| 284,366 | Germany | 1915 |
| 521,449 | Great Britain | May 22, 1940 |